United States Patent
Tricarico et al.

[11] Patent Number: 6,011,230
[45] Date of Patent: Jan. 4, 2000

[54] APPARATUS FOR HOLDING AN ELECTRODE FOR ELECTRICAL EROSION MACHINES

[75] Inventors: Claudio Tricarico, Nyon, Switzerland; Gerald Naville, Reigner; Eric Orhant, St. Jeoire en Faucigny, both of France

[73] Assignee: Charmilles Technologies SA, Meyrin, Switzerland

[21] Appl. No.: 09/149,378

[22] Filed: Sep. 8, 1998

[30] Foreign Application Priority Data

Sep. 9, 1997 [CH] Switzerland .................. 1997-2121/97

[51] Int. Cl.$^7$ ...................................................... B23H 1/00
[52] U.S. Cl. ...................................... 219/69.11; 219/69.15
[58] Field of Search ............................. 219/69.15, 69.2, 219/69.11; 408/149; 82/14

[56] References Cited

U.S. PATENT DOCUMENTS

| | | | |
|---|---|---|---|
| 3,715,167 | 2/1973 | Ollearo | 408/149 |
| 4,095,079 | 6/1978 | Ulmann et al. | 219/69.15 |
| 4,203,018 | 5/1980 | Schneider | 219/69.2 |
| 4,306,472 | 12/1981 | Kotte | 82/149 |
| 5,561,336 | 10/1996 | Girardin | 310/232 |

FOREIGN PATENT DOCUMENTS 405112  1/1991  European Pat. Off. .

*Primary Examiner*—Geoffrey S. Evans
*Attorney, Agent, or Firm*—Bachman & LaPointe, P.C.

[57] ABSTRACT

An apparatus for holding an electrode, in particular a cylindrical, tubular electrode in an electrical erosion machine, the electrode being held in a prismatic guide, wherein the electrode can be pressed by an elastic laminate against a prismatic guide.

10 Claims, 4 Drawing Sheets

APPARATUS FOR HOLDING AN ELECTRODE FOR ELECTRICAL EROSION MACHINES

BACKGROUND OF THE INVENTION

The present invention relates to an apparatus for holding an electrode, in particular a cylindrical, tubular electrode for an electrical erosion machine, which operates on the principle of spark-erosion machining.

In spark-erosion machining, the electrode is moved on a chosen track and the desired material erosion on a workpiece takes place by means of a spark discharge between this electrode and the workpiece. In the machining process, the electrode is continuously subject to wear, which leads to the electrode becoming shorter.

For spark-erosion machining, as described, for example, in U.S. Pat. No. 5,561,336, it is advantageous for the tool to be a tubular electrode which is located in a holder which, in turn, is held by a spindle which carries out a rotational movement. The principle of spark-erosion machining is preferably suitable for electrodes of small diameter. In a corresponding manner, the spindle and the electrode holder should have small dimensions in order to avoid unbalance problems, as well as problems with collisions between the electrode holder or spindle and the workpiece.

Conventionally available tool holders for use in machine tools are in general designed for transmitting relatively large torques and for withstanding the reaction. In this case, cone-cone couplings are used between the spindle and tool holder. The corresponding axial closing force which draws the tip of a cone of a tool holder into the corresponding spindle is thus very large (of the order of magnitude of 500 kg or more). It is also used to compensate for any play that there may be between the tool cone and the spindle cone. The force is sufficient to lengthen the cone of the tool holder and, as a consequence of this, to deform it. Since the spindle should be correspondingly small for electrodes with a small diameter, only small closing forces can be applied there. In consequence, any existing play cannot be compensated for by lengthening the cone of the tool holder.

Copper is preferably used as the electrode material, being soft and flexible; however, this property is disadvantageous for firmly clamping the electrode into a conventional holder, since such holders are designed for convention cutting tools, which are stiff and rigid.

Owing to wear, the electrodes frequently have to be replaced, preferably automatically. In the process, the worn electrode can be replaced either by replacement with the holder from the spindle or only by replacement of the electrode in the holder, with the new electrode being repositioned in the same holder. In order to continue the machining process without any problems after it has been necessary to replace an electrode, the free electrode end must be repositioned within a tolerance of plus or minus 0.01 mm. The precision with which a conventional cone-cone coupling can be repositioned is inadequate for this purpose and, in particular, an improvement in precision for a series of cones would be very costly.

Furthermore, very good sealing for the dielectric working liquid must be ensured at the connection points from the electrode to the holder and from the holder to the spindle. This liquid is introduced at a controlled pressure through the electrode in order to evacuate the erosion particles and is required in the formation of the desired spark discharge. In the case of a conventional tool holder, it is unnecessary to introduce working liquid through the tool, and, therefore, there are no sealing problems.

Accordingly, it is the principle object of the present invention to provide an electrode holder for erosion machines working on the principle of spark-erosion machining, which allows for an electrode to be fixed and for rotational movement to be carried out with good reproduction accuracy, wherein the electrode preferably comprises a small diameter, cylindrical copper tube. The holder is intended to ensure simple handling, and, in particular, the electrodes should not be damaged while being fitted to or removed from the holder.

SUMMARY OF THE INVENTION

The foregoing object is achieved by way of the present invention wherein an apparatus for holding an electrode in an electrical erosion machine comprises a prismatic guide for holding the electrode such that the electrode can be pressed by means of an elastic laminate against a surface of the prismatic guide.

Other advantages, features and details of the invention will be made clear from the following detailed description.

BRIEF DESCRIPTION OF THE DRAWINGS

An exemplary embodiment is explained in more detail with reference to the attached drawings, in which, schematically.

DETAILED DESCRIPTION

Figure 1:
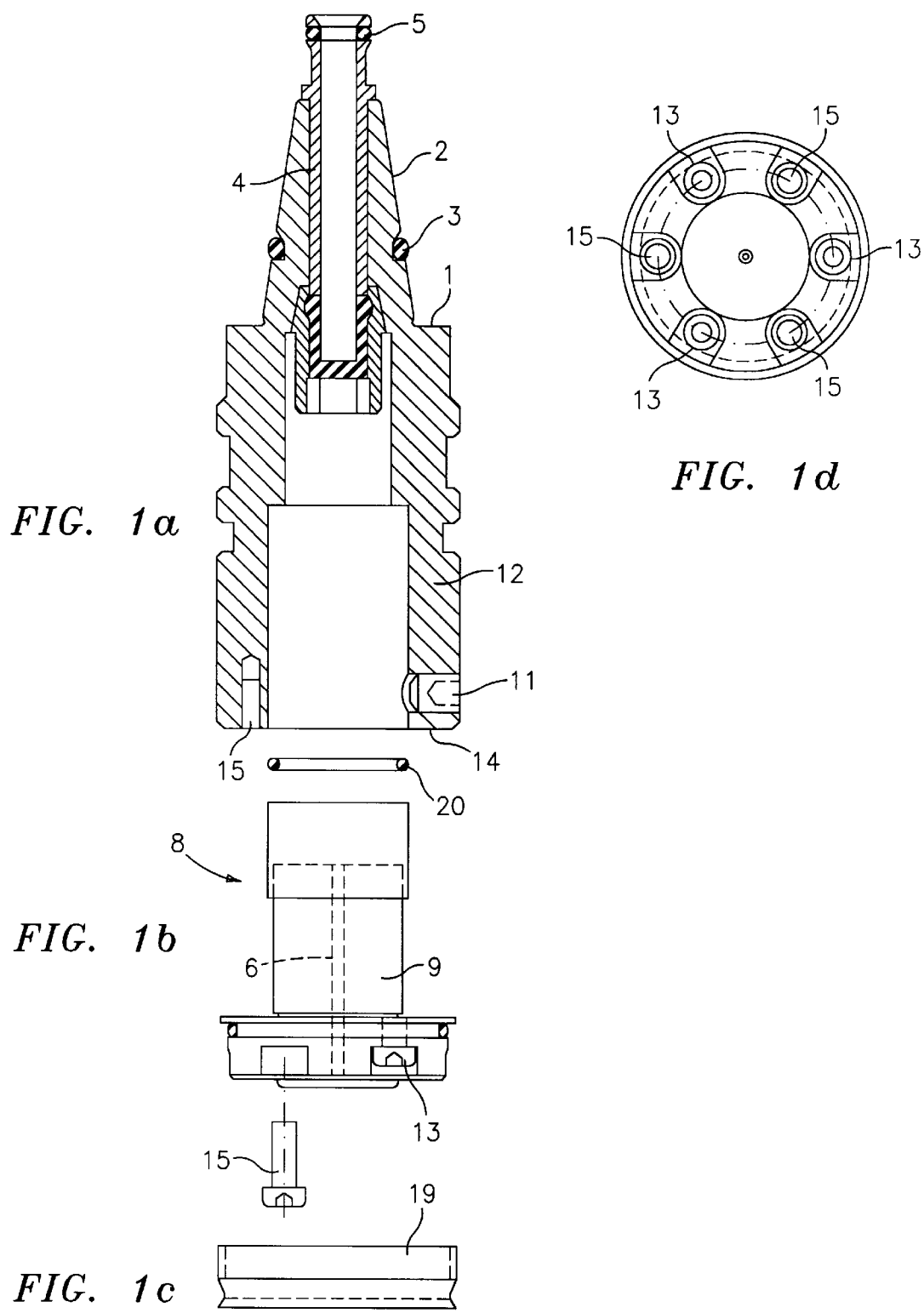
FIG. 1a shows a longitudinal section through the cone coupling of the holder.
FIG. 1b shows a longitudinal section of the prismatic guide.
FIG. 1c shows a view of the spray protection cap of the prismatic guide.
FIG. 1d shows a plan view of the prismatic guide.

With reference to the figures, the holder 12 is designed as a connection of a conical guide 2 to a planar stop surface 1. Such a planar stop surface can be produced very easily and cost-effectively with high precision, for example by grinding. This guarantees that the holder can be repositioned with a minimal vertical error. The convex cone of the holder 2 and the concave cone 24 of the spindle 23 of the machine (see FIG. 5) are used for guidance during the introduction of the holder into the spindle. When the two surfaces of the holder and the spindle are pressing against one another, then the system has play between the convex cone and the concave cone. The elastic, eccentric O-ring 3 advantageously allows this play to be compensated for with a closing force, and the holder to reach the radial position in the spindle repeatedly. This elastic eccentric O-ring 3 can be manufactured from rubber and, with an eccentricity of a few tenths of a millimeter ($4/10$), can advantageously be worked with low closing forces (of approximately 50 kg). The duplicated head piece 4 of the holder is used to transmit the closing force while avoiding any undesirable radial components of the closing force. The sealing ring 20 with the injection element 17 of FIG. 2 (not shown in FIG. 1) is located in the holder 12 and not in the spindle 23 and can thus be replaced easily, since it is a part subject to wear.

Figure 3:
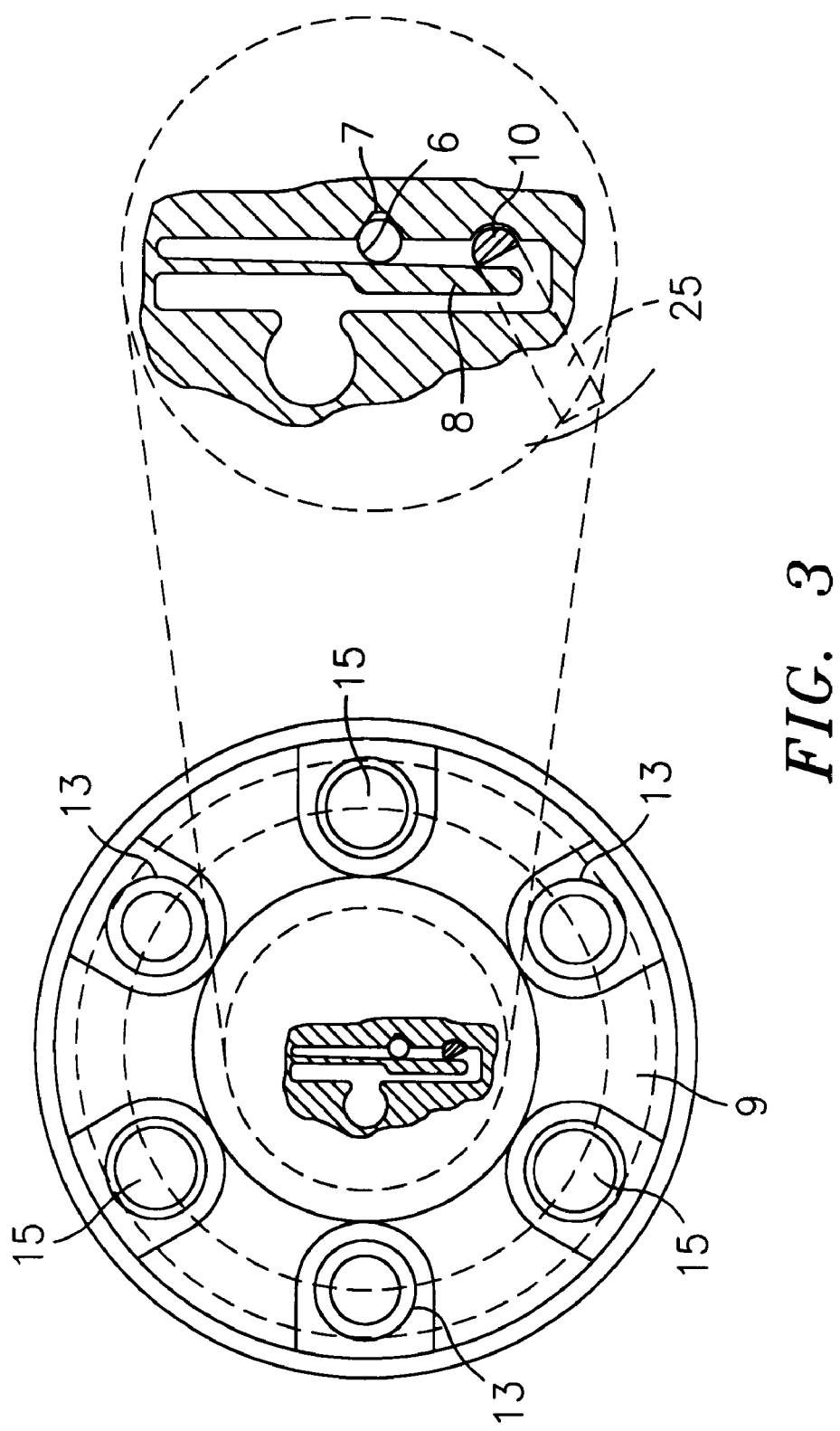
FIG. 3 shows a cross section through the prismatic guide, with an enlarged illustration of the elastic laminate.
Figure 4:
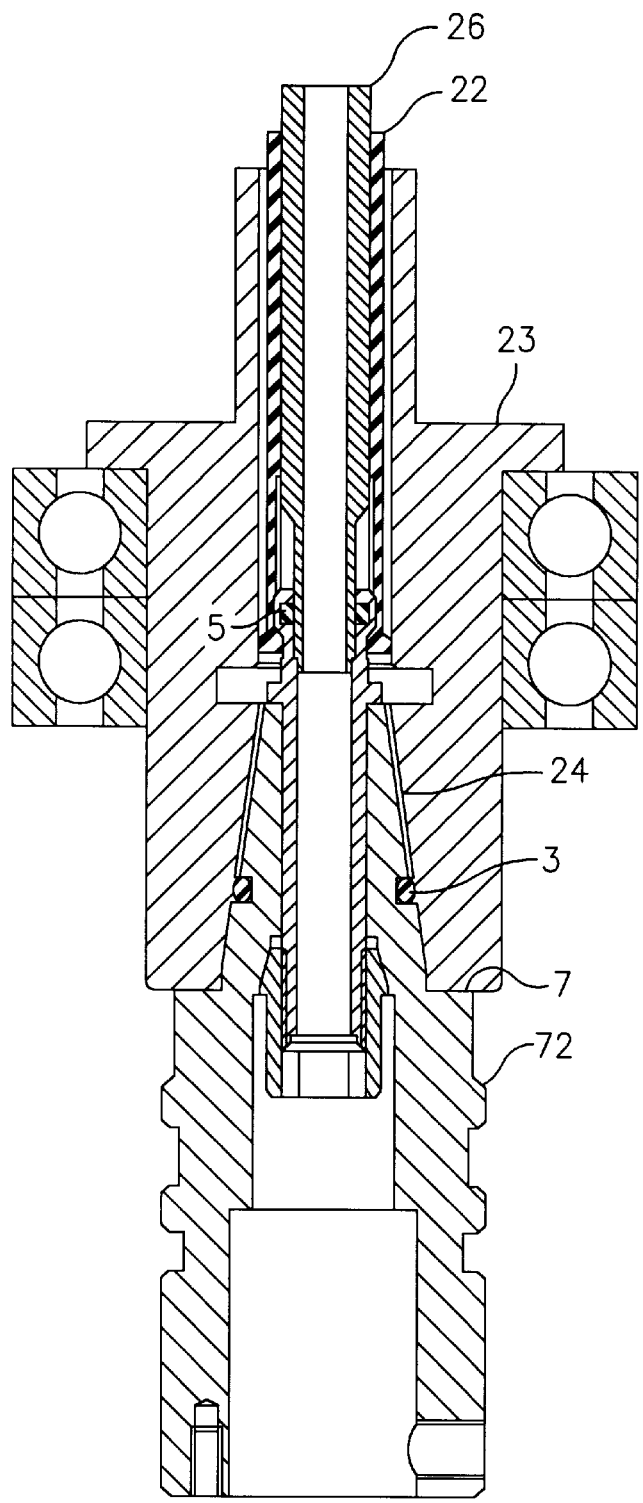
FIG. 4 shows a holder attached to a spindle for use in a spark-erosion machine.

In the case of the refinement of the prismatic guide 9 according to the invention, as illustrated in the drawings, a cylindrical electrode 6 is pressed by an elastic laminate 8 against the back notched surface 7 of the prism guide 9. This guide is matched to the electrode diameter being used. In FIG. 3, it is shown manufactured from one piece, which was produced at the same time as the prismatic guide 9. Other embodiments are obvious, for example the electrode can be pressed against the rear side of the prism by a detachable part.

A spreader 25 allows the electrode 6 to be removed and a new electrode to be inserted with virtually no mechanical load. This is important, particularly for small-diameter electrodes (for example 0.5 mm or 1 mm). A spreader 25 corresponding to the guide illustrated in FIG. 3 is a cylindrical metallic pin composed of polished steel which is inserted by hand into the opening 10 in order to bend the laminate 8 to the rear. The principle of this elastic laminate which can be decoupled is also permitted by an automatic apparatus which bends the spring laminate to the rear and, in the process, acts within or outside the holder 12. In this way, a worn electrode can be replaced directly in the holder 12, without any manual intervention.

The principle of the prismatic guide 9 allows electrodes to be inserted and removed without changing the position of the guide and without an operator readjusting the setting of the guide. A guide is set up definitively just once, and the replacement of electrodes has no adverse effect on this setting.

The system for setting the concentricity on the one hand and the perpendicularity on the other hand operates in a different way. As can be seen in FIGS. 1d and 3, the guide 9 is equipped with three sets of three screws each, and the screws have the functions described in the following text.

The concentricity is controlled by means of three radial screws 11 which are arranged radially at the lower end of the body of the holder 12. These screws 11 allow the position to be set in the horizontal plane of the prismatic guide 9 with respect to the body of the holder 12. These three screws are each offset through 120 degrees with respect to one another and with respect to the surfaces of the prism, by which means deformation of the surfaces of the prism is avoided when the screws are tightened for concentricity.

The parallelity to the rotation axis, that is to say the perpendicularity with respect to the lower stop surface 14 of the electrode holder, is controlled by means of three screws parallel to the axis 13. Screwed into the guide, these screws force the guide 9 away from the lower stop surface 14 of the holder 12 and in this way expand the blocking screws 15 in length, fine control of the parallelity of the electrode with respect to the rotation axis finally being achieved in this way. Three screws 15 are clamped into the body of the holder 12 parallel to the axis and allow the radial position of the prismatic guide to be fixed.

Figure 2:
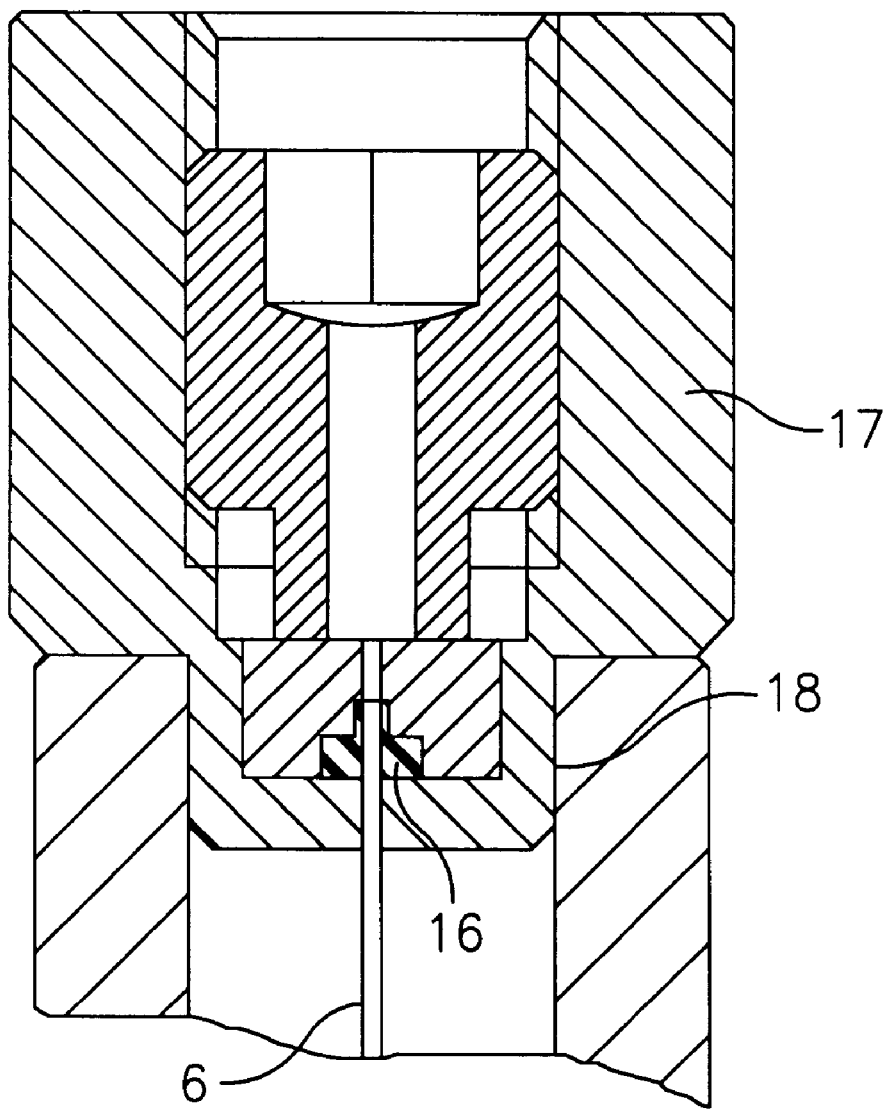
FIG. 2 shows a longitudinal section through the injection element.

The elements for ensuring the sealing of the holder during the introduction of the dielectric liquid are described in the following text. With reference to FIG. 2, the seal 16 between the electrode 6 and the injection element 17 is produced completely concentrically during assembly of the system by the injection element 17 being inserted into the body of the prismatic guide 9 with diametric play 18, which is filled with adhesive. Before the adhesive dries, a reference pin is inserted in place of an electrode in order in this way to fix the injection element 17 on the axis of the prismatic guide 9. The adjustment is permanently set when the adhesive dries. In this way, the element for injection of the dielectric liquid does not interfere with the positioning of an electrode in the prismatic guide.

The effect of the seal 20 between the prismatic guide 9 and the injection element 17 on the one hand as well as the body of the electrode holder 12 on the other hand does not interfere with the radial position of the guide. While the concentricity is being adjusted, the guide can be moved away from the center without endangering the sealing of the connection.

The rotational movement of the spindle likewise causes the dielectric liquid to carry out a rotational movement and, at the same time, it is introduced downward through the opening in the spray protection shroud 19 into the operation area under pressure. The ring which surrounds the opening has a characteristic curvature 21 which prevents the liquid from being driven out of the working zone owing to its centrifugal movement and, in the same way, this prevents liquid which has been contaminated with erosion particles from contaminating the area around the working zone.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. In an electrical erosion machine, an apparatus for holding an electrode in a desired position in said machine comprising: a holder; and a prismatic guide positioned in said holder, said prismatic guide having an electrode supporting surface and an elastic laminate for pressing the electrode against said electrode supporting surface for holding said electrode in place in said prismatic guide.

2. An apparatus according to claim 1, wherein said electrode supporting surface includes a notch which receives said electrode.

3. An apparatus according to claim 1, wherein said elastic laminate and said electrode supporting surface define therebetween a space and said apparatus further includes guiding means for biasing said elastic laminate away from said electrode support for releasing said electrode.

4. An apparatus according to claim 3, wherein said biasing means is positioned for rotation within said space for biasing said elastic laminate.

5. An apparatus according to claim 1, wherein said elastic laminate is integral with said prismatic guide.

6. An apparatus according to claim 1, further including adjustment means for positioning said prismatic guide within said holder.

7. An apparatus according to claim 6, wherein said adjustment means includes two sets of adjustment screws for adjusting the concentricity and perpendicularity, respectively, of said prismatic guide.

8. An apparatus according to claim 1, wherein said holder has a convex conical surface received in a concave conical surface of a spindle for coupling the holder to the spindle.

9. An apparatus according to claim 8, wherein an elastic O-ring is provided between the conical surfaces.

10. An apparatus according to claim 9, wherein the elastic O-ring is eccentric.

* * * * *